United States Patent
Esaki et al.

(10) Patent No.: US 9,030,113 B2
(45) Date of Patent: *May 12, 2015

(54) SEMICONDUCTOR LIGHT EMITTING ELEMENT DRIVE DEVICE AND LIGHTING FIXTURE WITH THE SAME

(71) Applicant: Panasonic Corporation, Osaka (JP)

(72) Inventors: Sana Esaki, Osaka (JP); Akinori Hiramatu, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 168 days.

This patent is subject to a terminal disclaimer.

(21) Appl. No.: 13/649,178

(22) Filed: Oct. 11, 2012

(65) Prior Publication Data

US 2013/0099691 A1    Apr. 25, 2013

(30) Foreign Application Priority Data

Oct. 24, 2011  (JP) .................................. 2011-232815

(51) Int. Cl.
*H05B 37/02*       (2006.01)
*H05B 33/08*       (2006.01)

(52) U.S. Cl.
CPC ........... *H05B 33/0815* (2013.01); *Y02B 20/346* (2013.01); *H05B 33/0845* (2013.01)

(58) Field of Classification Search
None
See application file for complete search history.

(56) References Cited

U.S. PATENT DOCUMENTS

| | | | | |
|---|---|---|---|---|
| 7,071,762 | B2 * | 7/2006 | Xu et al. | 327/423 |
| 7,535,183 | B2 * | 5/2009 | Gurr | 315/247 |
| 7,800,315 | B2 * | 9/2010 | Shteynberg et al. | 315/291 |
| 7,956,554 | B2 * | 6/2011 | Shteynberg et al. | 315/293 |
| 8,525,442 | B2 * | 9/2013 | Zimmermann et al. | 315/307 |
| 8,680,788 | B2 * | 3/2014 | Esaki et al. | 315/307 |
| 8,729,827 | B2 * | 5/2014 | Esaki et al. | 315/297 |
| 2001/0024112 | A1 * | 9/2001 | Jacobs et al. | 323/282 |
| 2006/0170370 | A1 * | 8/2006 | De Anna | 315/185 S |
| 2008/0018261 | A1 * | 1/2008 | Kastner | 315/192 |

FOREIGN PATENT DOCUMENTS

| | | |
|---|---|---|
| CN | 1829398 A | 9/2006 |
| JP | 2007-234415 A | 9/2007 |
| JP | 2011-108669 A | 6/2011 |
| WO | 2004/057921 A1 | 7/2004 |
| WO | 2011/114250 A1 | 9/2011 |

OTHER PUBLICATIONS

Office Action for corresponding Chinese Application No. 201210411825.3 issued May 15, 2014.

* cited by examiner

*Primary Examiner* — Jason M Crawford
*Assistant Examiner* — Nelson Correa
(74) *Attorney, Agent, or Firm* — Renner, Otto, Boisselle & Sklar, LLP (57) ABSTRACT

If a dimming ratio of a light source unit is higher than a first ratio, an ON width of a first switching device is increased with a second switching device kept off when the dimming ratio is increased, and also the ON width of the first switching device is decreased with the second switching device kept off when the dimming ratio is decreased. If a dimming ratio of the light source unit is lower than the first ratio, the ON width of the second switching device is regulated with the ON width of the first switching device held at a lower limit.

12 Claims, 7 Drawing Sheets

SEMICONDUCTOR LIGHT EMITTING ELEMENT DRIVE DEVICE AND LIGHTING FIXTURE WITH THE SAME

TECHNICAL FIELD

The invention relates to a semiconductor light emitting element drive device and a lighting fixture with the same.

BACKGROUND ART

International Publication Number WO 2004/057921 A1 discloses a supply assembly for an LED (a light emitting diode) lighting module, including a control switch for supplying a constant current to the LED lighting module. A dual switching signal composed of low frequency bursts of high frequency pulses is applied to the control switch. By varying the low frequency component of the dual switching signal, the average current through the LED lighting module may be varied in order to vary the light intensity outputted by the LED lighting module.

In what is called a burst dimming system for dimming such that a load current intermittently flows through the LED lighting module, it is necessary to set the module to a comparatively low frequency (about 120 Hz) when the module is dimmed so that luminous flux from the module becomes low.

In the burst dimming system, there is a concern of visible flicker caused by interference with a specific frequency of video equipment such as a video camera when the LED lighting module is seen through the video equipment. Because a load current intermittently flows through the LED lighting module, thereby generating an idle period during which no load current flows through the module.

In an amplitude control system for varying a peak value of a load current through an LED lighting module, it is possible to reduce a possibility of generation of visible flicker when the LED lighting module is seen through the video equipment. Because, in the amplitude control system, a load current continuously flows through the LED lighting module.

However, if the amplitude control system is applied to the aforementioned LED lighting module having an LED array, there is a problem that elements (LEDs) of the LED array each have dispersion in brightness. Because the elements of the LED array have dispersion in a forward voltage, and may have 15% or more dispersion in some array or element types, and therefore a voltage applied to the LED lighting module may decrease when luminous flux from the module under dimming is low. The problem becomes more marked as the number of LEDs connected in series is increased.

SUMMARY OF INVENTION

It is an object of the present invention to suppress such visible flicker when a light source unit is shot with video equipment, and also to reduce dispersion in brightness among elements of the light source unit when the unit is dimmed so that luminous flux from the unit becomes low.

A semiconductor light emitting element drive device (10) of the present invention comprises a direct-current power supply circuit (1, 2 and 3), a converter circuit (5) and a current regulation circuit (6). The direct-current power supply circuit (1, 2 and 3) is configured to output direct-current power. The converter circuit (5) has a first switching device (Q1) and is configured to input the power outputted from the direct-current power supply circuit (1, 2 and 3) to variably control an ON width of the first switching device (Q1), thereby supplying a load current to a light source unit (9) comprising light emitting elements (LD1). The current regulation circuit (6) comprises a series circuit, of an impedance component (R19 and R20) and a second switching device (Q2), connected in parallel with the light source unit (9), and is configured to variably control the load current through the light source unit (9) by regulation of an ON width of the second switching device (Q2). The control unit (7) is configured to control ON and OFF of the first and second switching devices (Q1 and Q2). The control unit (7) is further configured to control the dimming ratio of the light source unit (9). That is, if a dimming ratio of the light source unit (9) is higher than a first ratio, the control unit (7) increases the ON width of the first switching device (Q1) with the second switching device (Q2) kept off when increasing the dimming ratio of the light source unit (9), and also decreases the ON width of the first switching device (Q1) with the second switching device (Q2) kept off when decreasing the dimming ratio of the light source unit (9). If a dimming ratio of the light source unit (9) is lower than the first ratio, the control unit (7) regulates the ON width of the second switching device (Q2) with the ON width of the first switching device (Q1) held at a lower limit.

In an embodiment, the current regulation circuit (6) comprises: a series circuit, of an impedance component (R35 and R36) and a capacitor (C22), connected in parallel with the light source unit (9); a third switching device (Q4) adapted to discharge the capacitor (C22) when the third switching device is turned on; and an inductor (N2) placed along a discharge path of the capacitor (C22). In this embodiment, if the dimming ratio of the light source unit (9) is lower than the first ratio, a pulse voltage derived from an induced power of the inductor (N2) generated when the third switching device (Q4) discharges the capacitor (C22) is superposed on an output of the converter circuit (5).

In an embodiment, an ON and OFF frequency of the second switching device (Q2) is set to a higher frequency than that corresponding to a video equipment's shutter speed.

In an embodiment, an ON and OFF frequency of the third switching device (Q4) is set to 120 Hz or more.

In an embodiment, the control unit (7) is configured: to keep the third switching device (Q4) turned off if the dimming ratio of the light source unit (9) is higher than a second ratio; and also to control ON and OFF of the third switching device (Q4) if the dimming ratio of the light source unit (9) is lower than the second ratio.

In an embodiment, the control unit (7) comprises a microcomputer (IC4) configured to control ON and OFF of at least one of the first to third switching devices (Q1, Q2 and Q4) based on a dimming signal from outside.

A lighting fixture of the present invention comprises the semiconductor light emitting element drive device of any one of the embodiments. The lighting fixture also comprises: the light source unit (9) which comprises light emitting elements and is adapted to be driven with the semiconductor light emitting element drive device; and a fixture body in which the semiconductor light emitting element drive device (10) and the light source unit (9) are placed.

According to the present invention, it is possible suppress visible flicker when a light source unit is shot with video equipment, and also to reduce dispersion in brightness among elements of the light source unit when the unit is dimmed so that luminous flux from the unit becomes low.

BRIEF DESCRIPTION OF DRAWINGS

Preferred embodiments of the invention will now be described in further details. Other features and advantages of the present invention will become better understood with regard to the following detailed description and accompanying drawings where.

DESCRIPTION OF EMBODIMENTS

First Embodiment

Figure 1:
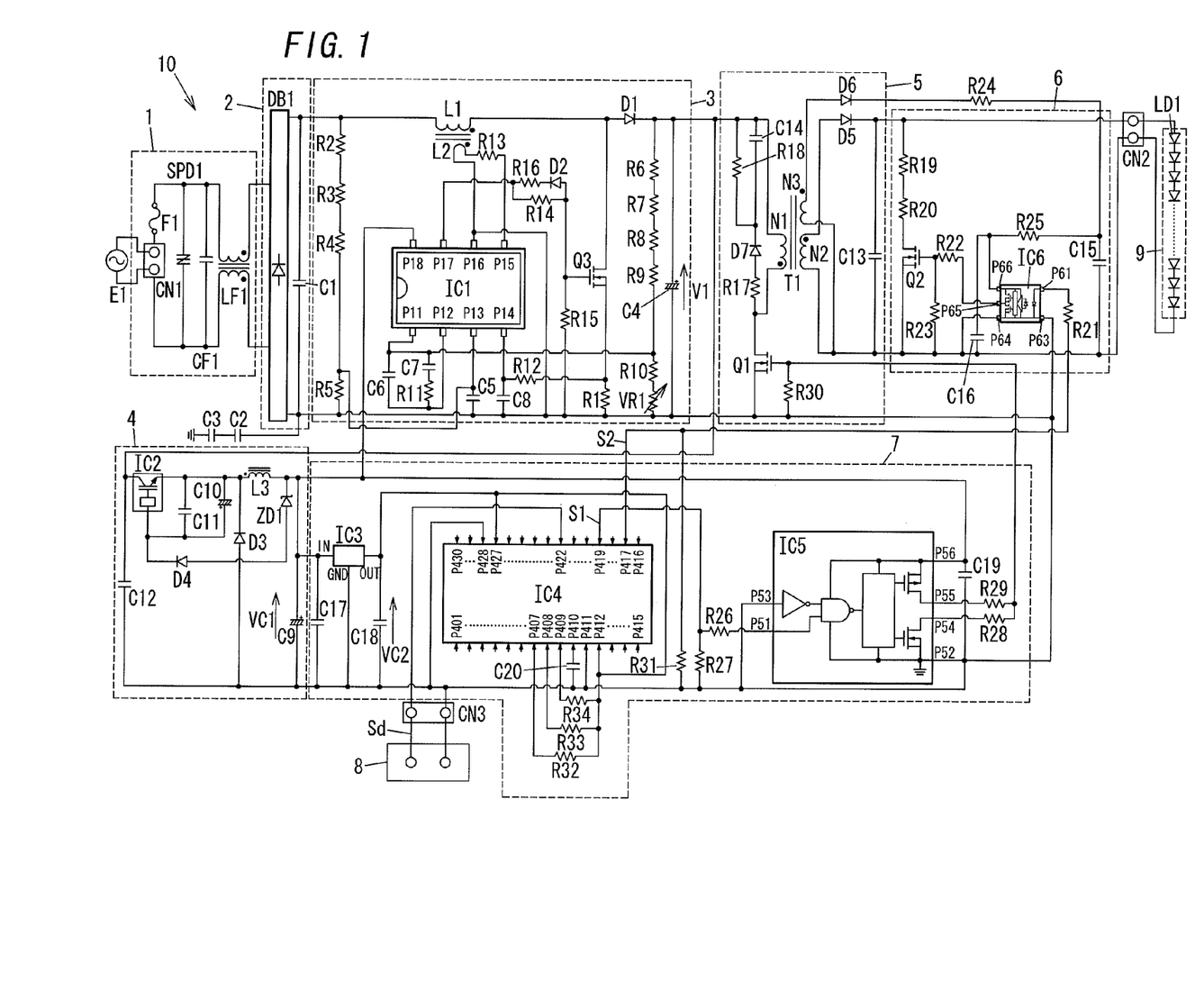
FIG. 1 is a circuit diagram of a semiconductor light emitting element drive device in accordance with a first embodiment of the present invention.

FIG. 1 shows a circuit diagram of a semiconductor light emitting element drive device 10 (hereinafter referred to as a "drive device 10") in the embodiment. The drive device 10 includes a filter circuit 1, a rectifier circuit 2, a boost chopper circuit 3, a control power circuit 4, a flyback converter circuit 5, a current regulation circuit 6, a control unit 7 and an external dimmer 8. An input power source for the drive device 10 is a commercial power supply (E1), and the drive device 10 is configured to supply an electric current to a light source unit 9 including a plurality of (in the embodiment, e.g., 32) light emitting diodes (LD1), thereby lighting the light source unit 9, where the light emitting diodes correspond to light emitting elements of the present invention. A configuration of the drive device 10 is hereinafter explained.

The filter circuit 1 is formed of: an input terminal (CN1) which can be connected to the commercial power supply (E1); a current fuse (F1); a surge protector device (SPD1); a filter capacitor (CF1); and a line filter (LF1). The input terminal (CN1) is connected to an input terminal of the line filter (LF1) through the current fuse (F1). Each of the surge protector device (SPD1) and the filter capacitor (CF1) is also connected in parallel with the input terminal of the line filter (LF1). An output terminal of the line filter (LF1) is connected to an input terminal of a full-wave rectifier (DB1) of the rectifier circuit 2. Thus, the filter circuit 1 is configured to remove power supply noise from the commercial power supply (E1).

The rectifier circuit 2 includes the full-wave rectifier (DB1) that is formed of a diode bridge, and an output terminal of the full-wave rectifier (DB1) is connected in parallel with a capacitor (C1) for high frequency bypass. A negative electrode of the output terminal of the full-wave rectifier (DB1) is ground on a circuit board, and is connected to ground in high frequency through a series circuit of capacitors (C2 and C3), namely to a case (chassis electric potential) in which a circuit block is placed.

The boost chopper circuit 3 includes: an inductor (L1); a switching device (Q3) formed of a MOSFET; a diode (D1); a smoothing capacitor (C4); and a PFC control circuit (IC1).

A positive electrode of the output terminal of the full-wave rectifier (DB1) is connected, through the inductor (L1), to a drain terminal of the switching device (Q3) and an anode terminal of the diode (D1). A source terminal of the switching device (Q3) is connected to the negative electrode of the output terminal of the full-wave rectifier (DB1) through a current sensing resistor (R1). A cathode terminal of the diode (D1) is connected to a positive electrode of the smoothing capacitor (C4). The smoothing capacitor (C4) is a large-capacity capacitor such as an aluminum electrolytic capacitor or the like.

The boost chopper circuit 3 is configured to turn the switching device (Q3) on and off at a high frequency to boost an undulating voltage from the full-wave rectifier (DB1) and also to smooth the undulating voltage through the smoothing capacitor (C4), thereby outputting a direct-current voltage (V1) (e.g., 410V).

In the embodiment, the filter circuit 1, the rectifier circuit 2 and the boost chopper circuit 3 correspond to a direct-current power supply circuit of the present invention.

The PFC control circuit (IC1) is formed of L6562A made by STMicroelectronics, and has first to eighth pins (P11-P18). The first pin (P11) (INV) is an inversion input terminal of a built-in error amplifier (not shown). The second pin (P12) (COMP) is an output terminal of the error amplifier. The third pin (P13) (MULT) is an input terminal of a built-in multiplication circuit (not shown). The fourth pin (P14) (CS) is a terminal detecting a chopper current. The fifth pin (P15) (ZCD) is a terminal for detecting zero cross. The sixth pin (P16) (GND) is a ground terminal. The seventh pin (P17) (GD) is a gate drive terminal. The eighth pin (P18) (Vcc) is a power terminal.

A voltage across the capacitor (C1) that is an input voltage of the boost chopper circuit 3 is converted into an undulating voltage by full wave rectification of an alternating-current voltage from the commercial power supply (E1). The undulating voltage is divided with a resistor (R5) and a series circuit of resistors (R2-R4), and noise is removed through a capacitor (C5). The voltage (undulating voltage) across the capacitor (C5) is applied to the third pin (P13) of the PFC control circuit (IC1), and is detected with the PFC control circuit (IC1). The built-in multiplication circuit connected to the third pin (P13) is used for controlling so that waveform of an input current from commercial power supply (E1) through the full-wave rectifier (DB1) becomes similar form to waveform of the undulating voltage.

A voltage across the smoothing capacitor (C4) (the direct-current voltage (V1)) is divided with a series circuit of resistors (R6-R9), and a series circuit of a resistor (R10) and a variable resistor (VR1), and then applied to the first pin (P11) of the PFC control circuit (IC1). Therefore, the voltage across the smoothing capacitor (C4) (the direct-current voltage (V1)) is detected with the PFC control circuit (IC1). Capacitors (C6 and C7) and a resistor (R11) connected between the first and second pins (P11 and P12) of the PFC control circuit (IC1) constitute a feedback impedance of the built-in error amplifier.

A voltage across the current sensing resistor (R1) is applied to the fourth pin (P14) of the PFC control circuit (IC1) through a noise filter circuit formed of a resistor (R12) and a capacitor (C8). Therefore, an electric current through the switching device (Q3) is detected with the PFC control circuit (IC1).

One end (a first end) of a secondary winding (L2) of the inductor (L1) is connected to the sixth pin (P16) of the PFC control circuit (IC1), namely the circuit ground, while the other end (a second end) of the secondary winding (L2) is connected to the fifth pin (P15) of the PFC control circuit (IC1) through a resistor (R13). Therefore, energy stored in the inductor (L1) is detected with the PFC control circuit (IC1).

If an output level of the seven pin (P17), namely the gate drive terminal of the PFC control circuit (IC1) becomes HIGH, an electric current flows through a resistor (R15) through a resistor (R14) and a voltage across the resistor (R15) increases. The switching device (Q3) is then turned on, if the voltage across the resistor (R15) becomes equal to or higher than a threshold voltage between the gate and source of the switching device (Q3). If the output level of the seven pin (P17) becomes LOW, an electric charge stored between the gate and source of the switching device (Q3) is discharged through a diode (D2) and a resistor (R16) and the switching device (Q3) is turned off.

The PFC control circuit (IC1) also turns the switching device (Q3) off if a value of an electric current through the switching device (Q3), detected through the fourth pin (P14) reaches a predetermined peak value. The PFC control circuit (IC1) also turns the switching device (Q3) on if energy store in the inductor (L1), detected through the fifth pin (P15) is discharged and becomes lower than a threshold.

The PFC control circuit (IC1) also controls so that an ON time of the switching device (Q3) becomes long if an undulating voltage detected through the third pin (P13) is high, while the ON time of the switching device (Q3) becomes short if the undulating voltage is low.

The PFC control circuit (IC1) further controls so that the ON time of the switching device (Q3) becomes short if a value of a voltage across the smoothing capacitor (C4) (direct-current voltage (V1)), detected through the first pin (P11) is higher than a target value, while the ON time of the switching device (Q3) becomes long if the value of the direct-current voltage (V1) is lower than the target value. Thus, The PFC control circuit (IC1) controls so that a value of a peak current through the switching device (Q3) agrees with the target value.

The control power circuit 4 is formed of an IPD device (IC2) connected to the smoothing capacitor (C4), and a peripheral circuit. The IPD device (IC2) is what is called an intelligent power device, and is formed of MIP2E2D made by Panasonic Corporation. The IPD device (IC2) is a device having three pins of a drain terminal, a source terminal and a control terminal, and is provided therein with a switching device formed of a power MOSFET, and a control circuit configured to control ON and OFF of the switching device. The built-in switching device of the IPD device (IC2), an inductor (L3), a smoothing capacitor (C9) and a diode (D3) constitute a boost chopper circuit. A zener diode (ZD1), a diode (D4), a smoothing capacitor (C10) and a capacitor (C11) constitute a power supply circuit for the IPD device (IC2). A capacitor (C12) for noise cut is connected to the drain terminal of the IPD device (IC2).

The control power circuit 4 is configured to generate, across the smoothing capacitor (C9), a control power voltage (VC1) obtained by stepping down a voltage (the direct-current voltage (V1)) across the smoothing capacitor (C4). The control power voltage (VC1) is employed as an operational power supply for the PFC control circuit (IC1), and after-mentioned integrated circuits (a 3-terminal regulator (IC3), a microcomputer (IC4) and a drive circuit (IC5) as a driver IC). Therefore, the smoothing capacitor (C9) is not charged before the IPD device (IC2) is activated, and accordingly other integrated circuits (IC1 and IC3-IC5) are not activated either. An operation of the control power circuit 4 is hereinafter explained.

At the beginning after the drive device 10 is connected to the commercial power supply (E1), the smoothing capacitor (C4) is charged by an output voltage of the full-wave rectifier (DB1), and an electric current then flows through a path of the drain terminal of the IPD device (IC2), the control terminal of the IPD device (IC2), the smoothing capacitor (C10), the inductor (L3) and the smoothing capacitor (C9). Accordingly, the smoothing capacitor (C10) is charged and then supplies an operating voltage to the IPD device (IC2). The IPD device (IC2) is activated, and then starts ON and OFF control of the built-in switching device.

When the switching device of the IPD device (IC2) is turned on, an electric current flows through a path of the smoothing capacitor (C4), the drain terminal of the IPD device (IC2), the source terminal of the IPD device (IC2), the inductor (L3) and the smoothing capacitor (C9), and the smoothing capacitor (C9) is charged. If the switching device of the IPD device (IC2) is then turned off, energy stored in the inductor (L3) is discharged into the smoothing capacitor (C9) through the diode (D3). Accordingly, a circuit formed of the built-in switching device of the IPD device (IC2), the inductor (L3), the diode (D3) and the smoothing capacitor (C9) functions as a boost chopper circuit. Consequently, a control power voltage (VC1) obtained by stepping down a voltage (the direct-current voltage (V1)) across the smoothing capacitor (C4) is generated across the smoothing capacitor (C9).

When the switching device of the IPD device (IC2) is turned off, regenerative energy (current) flows via the diode (D3) and a voltage across the inductor (L3) is clamped to a sum voltage (hereinafter referred to as "a first sum voltage") of a voltage across the smoothing capacitor (C9) and a forward voltage of the diode (D3). A voltage across the smoothing capacitor (C10) becomes a voltage obtained by subtracting a (second) sum voltage of a zener voltage across the zener diode (ZD1) and a forward voltage of the diode (D4) from the first sum voltage. The built-in control circuit of the IPD device (IC2) performs ON and OFF control of the switching device so that the voltage across the smoothing capacitor (C10) becomes constant. As a result, the voltage across the smoothing capacitor (C9) becomes constant as well.

If a control power voltage (VC1) is generated across the smoothing capacitor (C9), the PFC control circuit (IC1) is activated and the boost chopper circuit 3 is activated. In addition, the 3-terminal regulator (IC3) for producing an operational power supply (5V) for the microcomputer (IC4), as well as the microcomputer (IC4) and the drive circuit (IC5) are also activated. Accordingly, ON and OFF control of a switching device (Q1) of the flyback converter circuit 5 is started.

The flyback converter circuit 5 includes: a transformer (T1); the switching device (Q1) (a first switching device) formed of a MOSFET; a diode (D5); and a smoothing capacitor (C13). The flyback converter circuit 5 is configured to variably control ON pulse width (duration) of the switching device (Q1), thereby producing, across the smoothing capacitor (C13), a direct-current voltage obtained by stepping down the voltage across the smoothing capacitor (C4) (the direct-current voltage (V1)).

A positive electrode of the smoothing capacitor (C4) is connected to one end (a first end) of a primary winding (N1) of the transformer (T1), and a negative electrode of the smoothing capacitor (C4) is connected to a source terminal of the switching device (Q1). A drain terminal of the switching device (Q1) is connected to the other end (a second end) of the primary winding (N1). A series circuit of resistors (R17 and R18) and a diode (D7) is connected between both ends of the primary winding (N1). A capacitor (C14) is connected in parallel with the resistor (R18).

An anode terminal of the diode (D5) is connected to one end (a first end) of a first secondary winding (N2) of the transformer (T1), while a cathode terminal of the diode (D5) is connected to one end (a first end) of the smoothing capacitor (C13) of, e.g., 1 µF. The other end (a second end) of the first secondary winding (N2) is connected to the other end (a second end) of the smoothing capacitor (C13). A voltage across the smoothing capacitor (C13) is applied across the light source unit 9 through an output terminal (CN2). The current regulation circuit 6 is also connected in parallel with the smoothing capacitor (C13).

The current regulation circuit 6 includes: a resistor (R19) of, e.g., 2.7 kΩ and 3 W rated power; a resistor (R20) of, e.g., 2.7 kΩ and 3 W rated power; a switching device (Q2) formed of a MOSFETs and a photo-coupler (IC6).

The resistors (R19 and R20) as an impedance component and the switching device (Q2) constitute a series circuit and are connected in parallel with the smoothing capacitor (C13). The photo-coupler (IC6) is formed of TLP151 made by Toshiba Corporation and has first to sixth pins (P61-P66) except a second pin. The photo-coupler (IC6) is configured to turn the switching device (Q2) on and off in accordance with a second control signal (S2) from the microcomputer (IC4) of the control unit 7. In other words, the control unit 7 turns the switching device (Q2) on and off through a driver (the photo-coupler (IC6)). The photo-coupler (IC6) turns the switching device (Q2) on and off with the photo-coupler insulated from an output of the microcomputer (IC4).

The first pin (P61) of the photo-coupler (IC6) is an anode terminal of a built-in diode, and is connected to the microcomputer (IC4) through a resistor (R21) of, e.g., 2.7 kΩ. The third pin (P63) is a cathode terminal of the built-in diode and is connected to the circuit ground. The fourth pin (P64) is a ground terminal and is connected to the second terminal of the first secondary winding (N2) of the transformer (T1). The fifth pin (P65) is an output terminal. A series circuit of a resistor (R22) of, e.g., 100Ω and a resistor (R23) of, e.g., 15 kΩ is connected between the fourth and fifth pins (P64 and P65), and a junction of the resistors (R22 and R23) is connected to a gate terminal of the switching device (Q2). The sixth pin (P66) is a power terminal to which a power supply voltage is applied through a second secondary winding (N3) of the transformer (T1). A series circuit of a diode (D6), a resistor (R24) of, e.g., 100Ω and a capacitor (C15) is connected between both ends of the second secondary winding (N3) of the transformer (T1). A series circuit of a resistor (R25) of, e.g., 100Ω and a capacitor (C16) is connected in parallel with the capacitor (C15). The sixth pin (P66) is connected to a junction of the resistor (R25) and the capacitor (C16). The switching device (Q1) is repeatedly turned on and off and the capacitor (C15) is charged, and thereby a voltage across the capacitor (C15) is applied to the sixth pin (P66). That is, an output of the second secondary winding (N3) is commutated and smoothed, and power is then supplied to the photo-coupler (IC6).

If a second control signal (S2) from the microcomputer (IC4) is supplied to the first pin (P61), the current regulation circuit 6 turns the switching device (Q2) on and off in synchronization with a level of the second control signal (S2).

The control unit 7 includes the microcomputer (IC4), and is configured to produce a rectangular-wave signal (first and second control signals (S1 and S2)) for turning on and off the switching device (Q1) of the flyback converter circuit 5 and the switching device (Q2) of the current regulation circuit 6 in accordance with an internal program of the microcomputer (IC4).

The microcomputer (IC4) is formed of, e.g., 8 bit microcomputer 78 K0/Ix2 made by Renesas Electronics Corporation and has first to thirtieth pins (P401-P430).

A power supply voltage of the microcomputer (IC4) is, e.g., 5V, and accordingly the control power voltage (VC1) generated through the control power circuit 4 is converted into a power supply voltage (VC2) of, e.g., 5V for the microcomputer (IC4) through the 3-terminal regulator (IC3). An input terminal of the 3-terminal regulator (IC3) is connected to a positive electrode of the smoothing capacitor (C9), while an output terminal of the 3-terminal regulator (IC3) is connected to the twenty-seventh pin (P427) (a power terminal) of the microcomputer (IC4). A capacitor (C17) is connected between the input and ground terminals of the 3-terminal regulator (IC3), and a capacitor (C18) is connected between the output and ground terminals of the 3-terminal regulator (IC3). The twenty-eighth pin (P428) (a ground terminal) of the microcomputer (IC4) is connected to ground. Thus, the 3-terminal regulator (IC3) is configured to convert a voltage across the smoothing capacitor (C9) (the control power voltage (VC1)) into the power supply voltage (VC2) for the microcomputer (IC4) that is produced across the capacitor (C18), thereby supplying power to the microcomputer (IC4).

The twenty-second pin (P422) of the microcomputer (IC4) is connected to the external dimmer 8 through a connector (CN3), and is supplied with a dimming signal (Sd) from the external dimmer 8. The dimming signal (Sd) is formed of a rectangular-wave signal having an amplitude of, e.g., 5V and an oscillating frequency of, e.g., 1 kHz. A target dimming ratio of the light source unit 9 is determined by an ON duty (Don1) of the dimming signal (Sd), and becomes a maximum ratio of, e.g., 100% (full lighting (power)) if the ON duty (Don1) is 0% and is more decreased as the ON duty (Don1) is more increased. By the program, the microcomputer (IC4) is configured to read the ON duty (Don1), namely ON pulse width of the dimming signal (Sd) and control ON and OFF of the switching devices (Q1 and Q2) in accordance with the ON duty (Don1).

The microcomputer (IC4) is configured to output, from the nineteenth pin (P419), a first control signal (S1) for controlling ON and OFF of the switching device (Q1) in accordance with the ON duty (Don1) of the dimming signal (Sd). Accordingly, the drive circuit (IC5) turns the switching device (Q1) on and off in accordance with the first control signal (S1). The microcomputer (IC4) is a general-purpose IC, and accordingly other operation is not explained in detail.

The drive circuit (IC5) is formed of MAX15070A made by MAXIM corporation and has first to sixth pins (P51-P56). The first pin (P51) is a positive input terminal, and is connected to the nineteenth pin (P419) of the microcomputer (IC4) through a resistor (R26) of, e.g., 1 kΩ and supplied with a first control signal (S1). A junction of the resistor (R26) and the nineteenth pin (P419) is also connected to ground through a resistor (R27) of, e.g., 100 kΩ. The second pin (P52) is a ground terminal and connected to ground. The third pin (P53) is a negative input terminal and connected to ground. The fourth pin (P54) is an output terminal (a SYNC output terminal) of a built-in N-channel MOSFET and connected to a gate terminal of the switching device (Q1) through a resistor (R28) of, e.g., 10Ω. The fifth pin (P55) is an output terminal (a source output terminal) of a built-in P-channel MOSFET and connected to the gate terminal of the switching device (Q1) through a resistor (R29) of, e.g., 300Ω. The gate terminal of the switching device (Q1) is also connected to ground through a resistor (R30). The sixth pin (P56) is a power terminal, and is connected to the positive electrode of the smoothing capacitor (C9) and also connected to ground through a capacitor (C19) of, e.g., 0.1 μF. The sixth pin (P56) is supplied with a control power voltage (VC1) of, e.g., 15 V.

The drive circuit (IC5) amplifies a first control signal (S1) having an amplitude of, e.g., 5V from the microcomputer (IC4) so that the amplitude becomes, e.g., 15V, and supplies the amplified signal to the gate terminal of the switching device (Q1), thereby turning the switching device (Q1) on and off. The drive circuit (IC5) is a general-purpose IC, and accordingly a concrete operation is not explained in detail.

The microcomputer (IC4) is configured to output, from the seventeenth pin (P417), a second control signal (S2) for controlling ON and OFF of the switching device (Q2) in accordance with the ON duty (Don1) of the dimming signal (Sd). The photo-coupler (IC6) turns the switching device (Q2) on and off in accordance with the second control signal (S2). The seventeenth pin (P417) of the microcomputer (IC4) is connected to the first pin (P61) of the photo-coupler (IC6) through the resistor (R21), and also connected to ground through a resistor (R31).

A peripheral circuit is connected to the microcomputer (IC4) according to usage environment. In the embodiment, the twelfth pin (P412) is connected to the output terminal of the 3-terminal regulator (IC3). The seventh, eighth and ninth pins (P407, P408 and P409) are connected to the output terminal of the 3-terminal regulator (IC3) through resistors (R32, R33 and R34), respectively. The tenth pin (P410) is connected to ground through a capacitor (C20).

Figure 2:
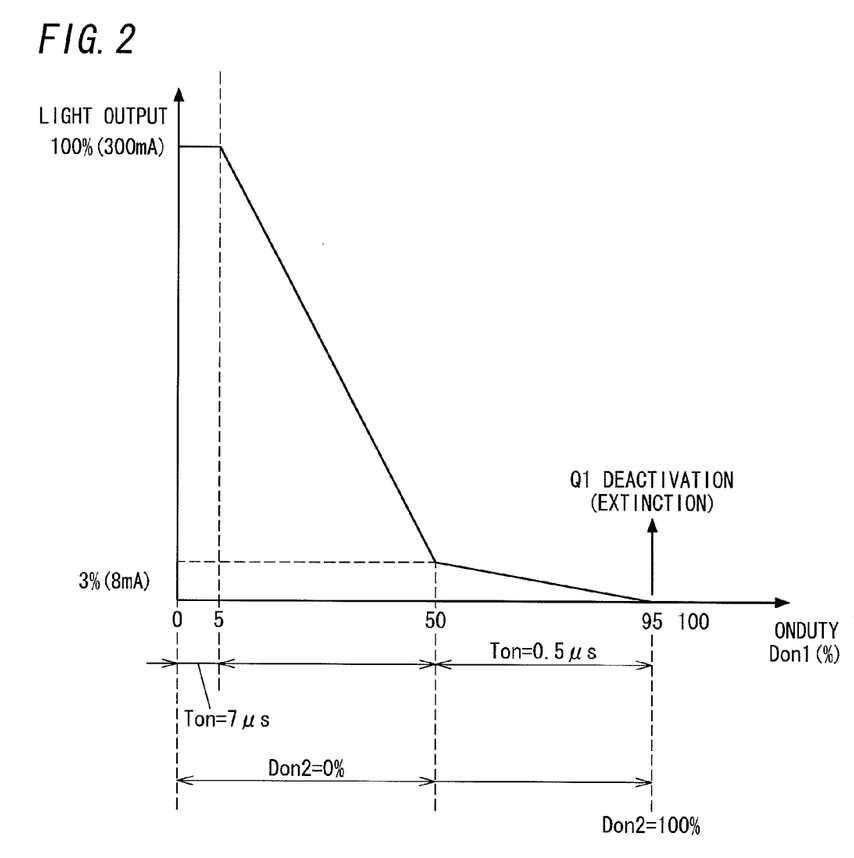
FIG. 2 is a graph showing a relationship between on-duty of a dimming signal and light output.

An operation of the drive device 10 in the embodiment is next explained with FIG. 2 that is a graph showing a light output (a dimming ratio) of the light source unit 9 and a load current effective value through the light source unit 9 with respect to an ON duty (Don1) of a dimming signal (Sd).

As shown in FIG. 2, a target dimming ratio of the light source unit 9 is set to a maximum ratio of, e.g., 100% (a load current of 300 mA) if an ON duty (Don1) of a dimming signal (Sd) is in a first range (e.g., 0-5%). The target dimming ratio is also set: to more decrease as the ON duty (Don1) is more increased from an upper limit of the first range (e.g., 5%) if the ON duty (Don1) is in a second range (e.g., 5-50%); and to be a first ratio of, e.g., 3% (a load current of 8 mA) if the ON duty (Don1) reaches an upper limit of the second range (e.g., 50%). The target dimming ratio is further set: to more decrease at a more gradual rate than that in the second range as the ON duty (Don1) is more increased if the ON duty (Don1) is in a third range (e.g., 50-95%); and to be a minimum ratio of, e.g., 0% (extinction) if the ON duty (Don1) reaches 95% or more. An operation for realizing such dimming control is hereinafter explained. The first ratio (e.g., 3%) in the embodiment is lower than the maximum ratio and higher than the minimum ratio, and corresponds to a first ratio of the present invention.

Figure 3:
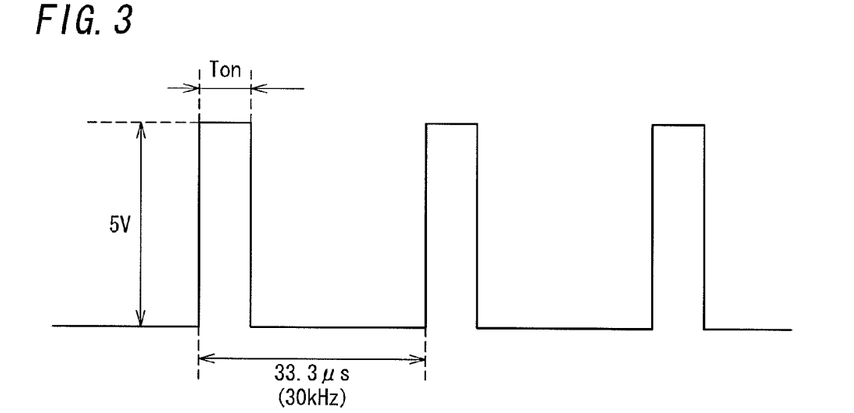
FIG. 3 illustrates a waveform of a first control signal.

A dimming signal (Sd) is supplied to the twenty-second pin (P422) of the microcomputer (IC4) through the connector (CNA and the microcomputer (IC4) detects an ON duty (Don1) (an ON pulse width) of the dimming signal (Sd). Based on the ON duty (Don1), the microcomputer (IC4) decides an ON pulse width (Ton) (an ON width) of a first control signal (S1) and an ON duty (Dong) of a second control signal (S2). As shown in FIG. 3, the first control signal (S1) is formed of a rectangular-wave signal having an (first) oscillating frequency of, e.g., 30 kHz (a period of 33.3 μs) and an amplitude (a voltage value) of, e.g., 5V.

The microcomputer (IC4) sets an ON pulse width (Ton) of the first control signal (S1) to, e.g., 7 μs if an ON duty (Don1) of the dimming signal (Sd) is in 0-5%.

The microcomputer (IC4) sets an ON duty (Dong) of the second control signal (S2) to 0% to (turn or) keep the switching device (Q2) turned off if an ON duty (Don1) of the dimming signal (Sd) is in 0-50%.

The first control signal (S1) is supplied to the drive circuit (IC5) that amplifies the first control signal (S1) so that an amplitude of the signal (S1) becomes, e.g., 15V, and supplies the amplified signal (S1) to the gate of the switching device (Q1) in the flyback converter circuit 5. The switching device (Q1) is accordingly turned on and off in synchronization with a level of the first control signal (S1). When an ON pulse width (Ton) of the first control signal (S1) is 7 μs, an electric current through the light source unit 9 is set to 300 mA and the light source unit 9 is in full lighting state (namely, driven at full power or rated power).

An operation when an ON duty (Don1) of the dimming signal (Sd) is 5% or more is next explained. The microcomputer (IC4) more decreases an ON pulse width (Ton) of the first control signal (S1) from 7 μs as an ON duty (Don1) of the dimming signal (Sd) is more increased than 5%, and sets an ON pulse width (Ton) of the first control signal (S1) to, e.g., 0.5 μs (an lower limit) if an ON duty (Don1) of the dimming signal (Sd) becomes 50%. Accordingly, an ON pulse width of a drive signal supplied to the switching device (Q1) is more decreased as an ON duty (Don1) of the dimming signal (Sd) is more increased than 5%, and therefore a load current supplied to the light source unit 9 is also more decreased. When an ON pulse width (Ton) of the first control signal (S1) is 0.5 μs, a load current is set (regulated) to 8 mA (a dimming ratio of 3%). In this instance, a high-frequency electric current of 30 kHz flows through the first secondary winding (N2) of the transformer (T1), but the current is smoothed with the capacitor (C13) and accordingly a load current through the light source unit 9 becomes a direct current almost without ripple, and does not interfere with video cameras. This advantage can be obtained if capacity of the capacitor (C13) is 1 μF or more.

An operation when an ON duty (Don1) of the dimming signal (Sd) is 50% or more is next explained. With the ON pulse width (Ton) of the first control signal (S1) kept 0.5 μs, the microcomputer (IC4) more increases an ON duty (Don2) of the second control signal (S2) as an ON duty (Don1) of the dimming signal (Sd) is more increased than 50%.

The second control signal (S2) is formed of a rectangular-wave signal having an (second) oscillating frequency of, e.g., 5 kHz that is lower than that of the first control signal (S1), and the microcomputer (IC4) decomposes one period (cycle) of the second control signal (S2) into 1000 steps (1 step=200 ns) and controls an ON duty (Don2) of the second control signal (S2) at intervals of 200 ns. The microcomputer (IC4) more increases an ON duty (Don2) of the second control signal (S2) from 0% as an ON duty (Don1) of the dimming signal (Sd) is more increased from 50%. If an ON duty (Don1) of the dimming signal (Sd) becomes 95%, the microcomputer (IC4) sets an ON duty (Don2) of the second control signal (S2) to 100%. In the embodiment, if an ON duty (Don1) of the dimming signal (Sd) becomes 95%, the microcomputer (IC4) sets the first control signal (S1) to a low level and deactivates the flyback converter circuit 5, thereby turning the light source unit 9 off.

That is, an ON duty (Don1) of the dimming signal (Sd) is increased from 50% and an ON duty (Don2) of the second control signal (S2) is increased, and thereby an ON duty of the switching device (Q2) in the current regulation circuit 6 is increased as well.

If the switching device (Q2) is turned on, an electric current flows from the flyback converter circuit 5 toward the resistors (R19 and R10) and the switching device (Q2), and accordingly a load current supplied from the flyback converter circuit 5 to the light source unit 9 is reduced by the shunt (by moving to a path of resistors (R19 and R10) and the switching device (Q2)). It is therefore possible to variably control the load current by controlling an ON duty of the switching device (Q2). Accordingly, an ON duty (Don2) of the second control signal (S2) (an ON duty of the switching device (Q2)) is increased and a load current through the light source unit 9 is decreased, and thereby a dimming ratio of the light source unit 9 can be further decreased from 3% (a load current of 8 mA).

While a forward voltage (Vf) applied to the light source unit 9 is kept, only the load current is reduced by the shunt. Therefore, even when a comparatively small load current (e.g., a load current of 8 mA or less) flows through the light source unit 9, lighting states of the light emitting diodes (LD1) in the light source unit 9 are each stabled, and dispersion in brightness among them is suppressed.

There is no extreme change in brightness even though the switching device (Q2) starts to be turned on and off, and an accurate dimming control is subsequently possible, because the microcomputer (IC4) controls an ON duty of the switching device (Q2) at constant intervals shorter than one period of the second control signal (S2) (e.g., at intervals of 200 ns). In the embodiment, an ON duty of the switching device (Q2) is controlled at a rate of 200 ns, but the embodiment is not limited to such a rate. Each step can be changed by the program for the microcomputer (IC4), and accordingly a desired dimming curve can be obtained. In the embodiment, since the microcomputer (IC4) controls ON and OFF of the switching devices (Q1 and Q2), it is possible to easily change settings of ON and OFF of the switching devices (Q1 and Q2) by changing only settings in the program.

In the embodiment, an oscillating frequency of the second control signal (S2) for controlling ON and OFF of the switching device (Q2) is set to 5 kHz higher than that corresponding to a shutter speed of video equipment such as a video camera. Therefore, even if a load current having ripples is supplied to the light source unit 9, it is possible to suppress the interference with the video camera. In confirmatory experiment, no flicker or the like occurred in video shoot even if a shutter speed of a video camera is 1/8000 of a second.

Conventionally, there is a problem that a transformer buzzing noise occurs if a converter circuit is intermittently driven at a few kHz, in order to prevent the interference with video cameras. In the embodiment, the problem can be solved because the flyback converter circuit 5 continuously operates even when luminous flux with respect to the light source unit 9 is low.

In the embodiment, the dimming signal (Sd) is a rectangular-wave signal, but the embodiment is not limited to this. For example, the embodiment may be configured so that a dimming signal (Sd) is formed of a direct-current voltage of which voltage value is changed in accordance with a target dimming signal, and the microcomputer (IC4) reads the change of the voltage value. The embodiment may be also configured so that an infrared receiving device is provided and a dimming control is performed by an infrared signal.

Second Embodiment

Figure 4:
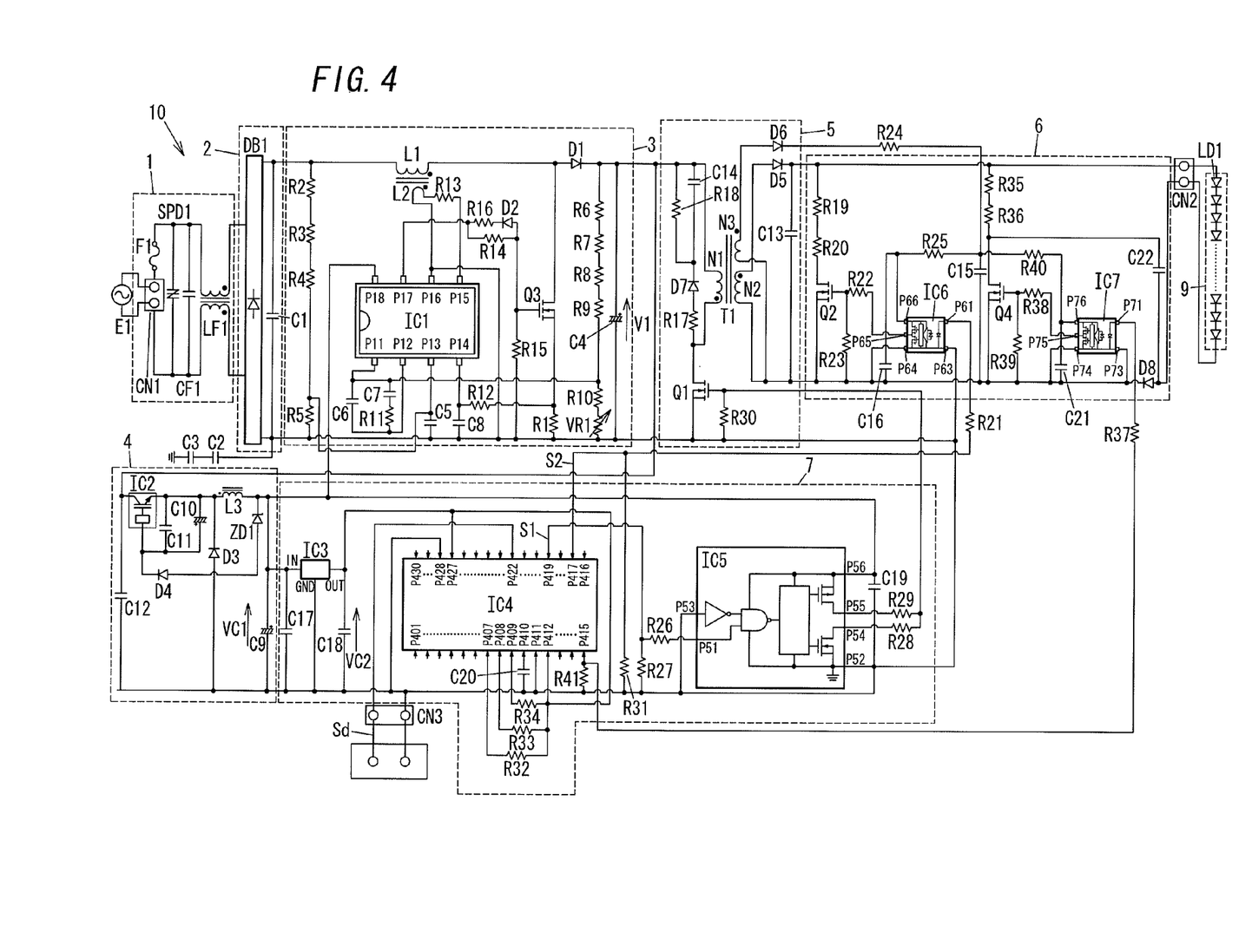
FIG. 4 is a circuit diagram of a semiconductor light emitting element drive device in accordance with a second embodiment of the present invention.

FIG. 4 shows a circuit diagram of a drive device 10 in accordance with a second embodiment of the present invention. For the purpose of clarity, like kind elements are assigned the same reference numerals as depicted in the first embodiment.

A current regulation circuit 6 of the embodiment shares a first secondary winding (N2) (an inductor) of a transformer (T1) with a flyback converter circuit 5, and the following configuration is added to the current regulation circuit 6.

The current regulation circuit 6 further includes a switching device (Q4) (a third switching device), resistors (R35-R40), a photo-coupler (IC7), capacitors (C21 and C22), and a diode (D8). A series circuit of the resistors (R35 and R36) as an impedance component and the switching device (Q4) is connected in parallel with the smoothing capacitor (C13).

The photo-coupler (IC7) has first to sixth pins (P71-P76) other than a second pin, and is configured to turn the switching device (Q4) on and off in accordance with a third control signal (S3) supplied from the microcomputer (IC4). That is, the photo-coupler (IC7) turns the switching device (Q4) on and off with the photo-coupler insulated from an output of the microcomputer (IC4). The first pin (P71) is an anode terminal of a built-in diode, and connected to the fifteenth pin (P415) of the microcomputer (IC4) through the resistor (R37). The third pin (P73) is a cathode terminal of the built-in diode, and connected to the second end of the first secondary winding (N2) of the transformer (T1). The fourth pin (P74) is a ground terminal, and connected to the second end of the first secondary winding (N2) of the transformer (T1). The fifth pin (P75) is an output terminal, and a series circuit of the resistor (R38) of, e.g., 100Ω and the resistor (R39) of, e.g., 15 kΩ is connected between the fourth and fifth pins (P74 and P75), and a junction of the resistors (R38 and R39) is connected to the gate terminal of the switching device (Q4). The sixth pin (P76) is a power terminal, and can obtain a power supply voltage though the second secondary winding (N3) of the transformer (T1). A series circuit of the resistor (R40) of, e.g., 100Ω and the capacitor (C21) is connected in parallel with the capacitor (C15), and the sixth pin (P76) is connected to a junction of the resistor (R40) and the capacitor (C21). An output of the second secondary winding (N3) is commutated and smoothed and then power is supplied to the sixth pin (P76). A series circuit of the capacitor (C22) and the diode (D8) is connected between the drain and source of the switching device (Q4), and the cathode of the diode (D8) is connected to the source of the switching device (Q4) and the second end of the first secondary winding (N2) of the transformer (T1).

The fifteenth pin (P415) of the microcomputer (IC4) is connected to ground through the resistor (R41), and the microcomputer (IC4) is configured to supply the third control signal (S3) from the fifteenth pin (P415) to the photo-coupler (IC7), thereby controlling ON and OFF of the switching device (Q4).

Figure 5:
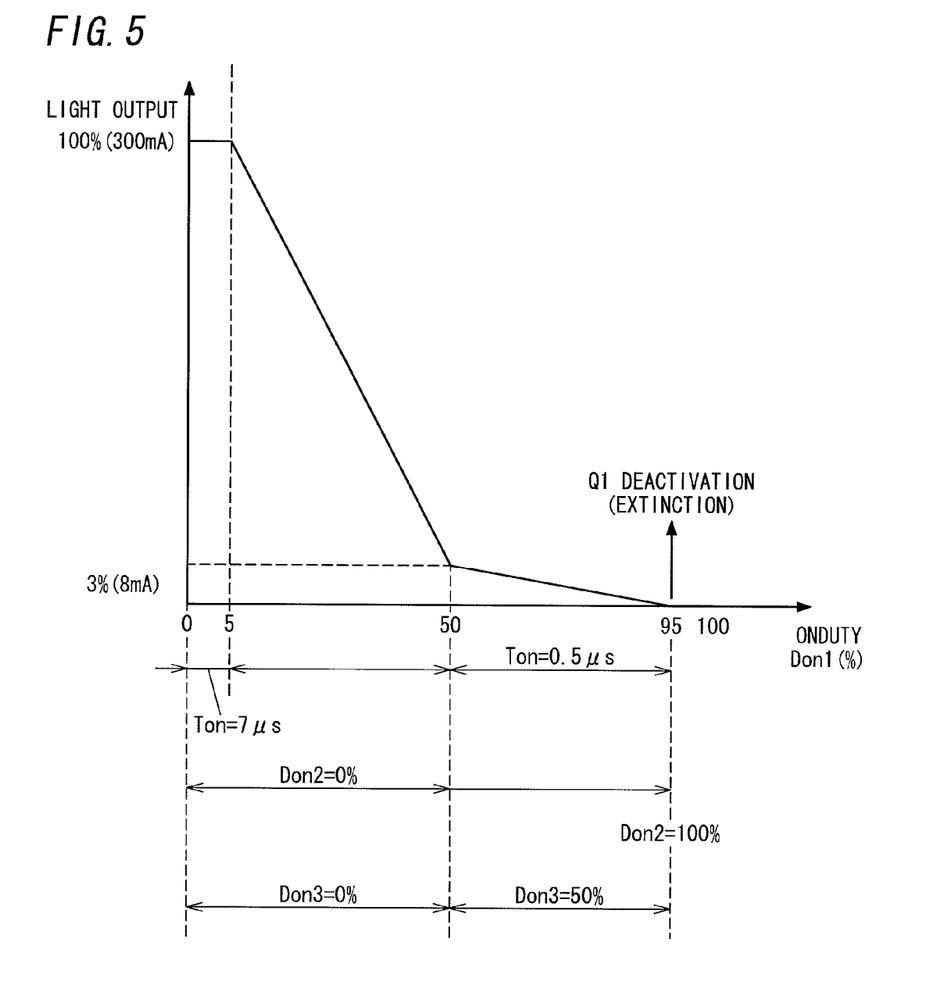
FIG. 5 is a graph showing a relationship between on-duty of a dimming signal and light output.

An operation of the drive device 10 in the embodiment is next explained with reference to FIGS. 5, 6A and 6B. The first and second control signals (S1 and S2) supplied from the microcomputer (IC4) are the same as those of the first embodiment, and accordingly are not explained in detail.

The microcomputer (IC4) sets an ON duty (Don3) of the third control signal (S3) to, e.g., 0% if an ON duty (Don1) of the dimming signal (Sd) is in 0-50%, and the switching device (Q4) is (turned or) kept off. If an ON duty (Don1) of the dimming signal (Sd) is more increased than 50%, the microcomputer (IC4) sets the third control signal (S3) so that an (third) oscillating frequency of the signal (S3) becomes, e.g., 120 Hz (lower than the second oscillating frequency) and an ON duty (Don3) of the signal (S3) becomes, e.g., 50%, thereby controlling ON and OFF of the switching device (Q4). That is, when a dimming ratio is lower than 3%, the switching device (Q4) is turned on and off.

When the switching device (Q4) is tuned off, an electric current flows through a path of the resistor (R35), the resistor (R36) and the capacitor (C22), and the capacitor (C22) is charged. If a level of the third control signal (S3) is inverted and the switching device (Q4) is turned on from the OFF state, the capacitor (C22) is discharged. Accordingly, an electric current flows through the first secondary winding (N2) (the inductor) of the transformer (T1) through the switching device (Q4) from the capacitor (C22), and thereby induced power generates at the first secondary winding (N2) and a pulse voltage is superposed on a voltage across the capacitor (C13). The capacitor (C22) may have a small capacity (e.g., pF order) such that a pulse voltage can be applied when the switching device (Q4) is turned on from the OFF state.

Figure 6A:
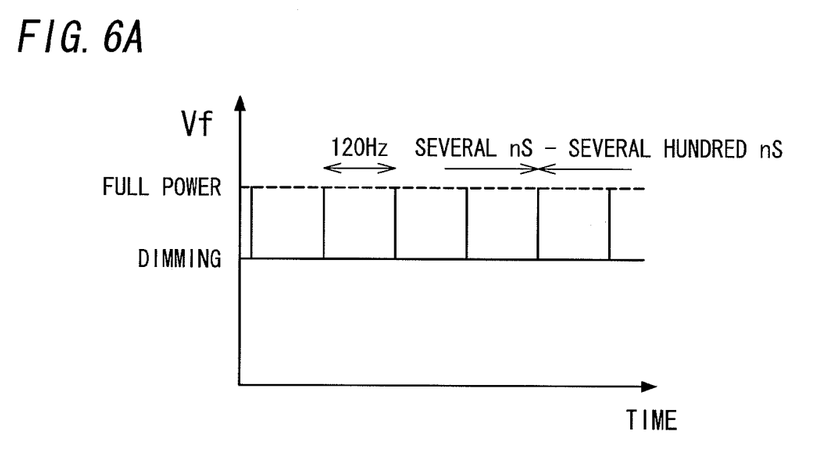
FIG. 6A illustrates a waveform of a forward voltage on which pulse voltages are superposed.
Figure 6B:
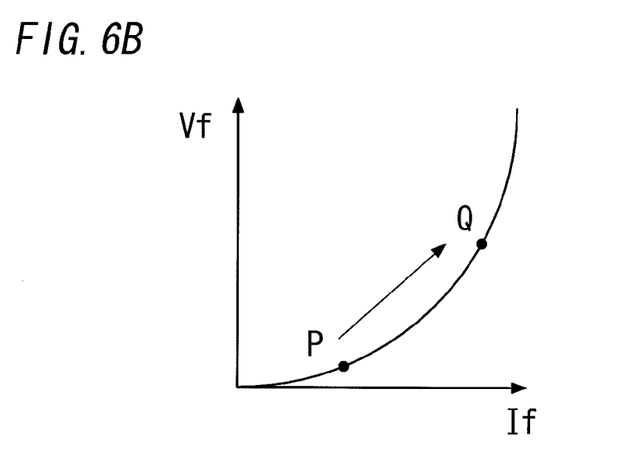
FIG. 6B is a graph showing fluctuation of the forward voltage and a forward current when the pulse voltages are superposed on the forward voltage.

As shown in FIG. 6A, a forward voltage (Vf) applied to the light source unit 9 has a waveform in which a pulse voltage of approximately several ns to several hundred ns is superposed on a voltage across the capacitor (C13) during dimming by discharge of the capacitor (C22) with a period of 120 Hz. Accordingly, as shown in FIG. 6B, the forward voltage (Vf) applied to the light source unit 9 can be periodically shifted from an operating point (P) to an operating point (Q), wherein in the operating point (P), a small forward current (If) flows through the light source unit 9 and the light output has large dispersion in brightness, while in the operating point (Q), a large forward current (If) flows through the light source unit 9 and the light output has small dispersion in brightness. Accordingly, in the embodiment, it is possible to further suppress dispersion in brightness with respect to each light emitting diode (LD1) of the light source unit 9 when the dimming ratio is 3% or less (low luminous flux in case of a load current of 8 mA or less). Larger advantage can be obtained as ON and OFF frequency of the switching device (Q4) is lower. In the embodiment, the oscillating frequency of the third control signal (S3) is set to 120 Hz in order to avoid invisible flicker to human eyes, but may be set to more than 120 Hz.

In the embodiment, the switching device (Q4) starts to be turned on and off at the same timing as a timing at which the switching device (Q2) starts to be turned on and off (a dimming ratio of 3% or less (a load current of 8 mA or less)), but the embodiment is not limited to this. For example, the aforementioned advantage can be obtained by turning the light source unit 9 on up to extremely low luminous flux that a load current through the unit 9 becomes 200 μA (a value corresponding to a second ratio) or less, and to start turning the switching device (Q4) on and off before the light emitting diodes (LD1) each have dispersion in brightness. That is, the control unit 7 is configured: to keep the switching device (Q4) off when the dimming ratio of the light source unit 9 is higher than the second ratio; and to control ON and OFF of the switching device (Q4) when the dimming ratio of the light source unit 9 is lower than the second ratio. In other words, when the dimming ratio of the light source unit 9 is lower than the second ratio, the control unit 7 turns the switching device (Q4) on and off through a driver (the photo-coupler (IC7)). A timing at which the switching device (Q4) starts to be turned on and off is controlled through the microcomputer (IC4), and accordingly can be easily changed by the program.

Third Embodiment

Each drive device 10 in the first and second embodiments includes, as a converter circuit, a flyback type of DC/DC converter circuit (a flyback converter circuit 5), but may include a forward type of DC/DC converter circuit in place of the flyback type of DC/DC converter circuit.

The converter circuit is not limited to the aforementioned insulation type of converter circuit. For example, the converter circuit may be a non-insulation type of converter circuit as shown in FIGS. 7A-7D.

Figure 7A:
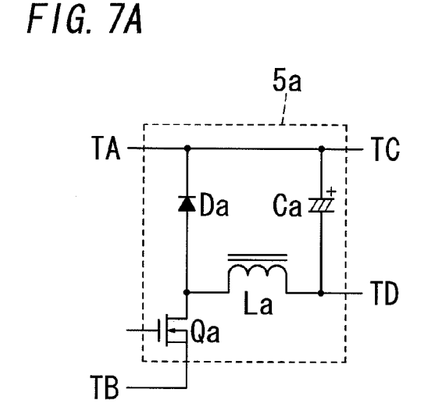
FIG. 7A is a circuit diagram of a buck converter.

FIG. 7A shows a buck chopper circuit 5a formed of: a series circuit of a capacitor (Ca), an inductor (La) and a switching device (Qa); and a diode (Da) connected in parallel with a series circuit of the capacitor (Ca) and the inductor (La). Input terminals (TA and TB) of the buck chopper circuit 5a are both ends of the series circuit of the capacitor (Ca), the inductor (La) and the switching device (Qa), and output terminals (TC and TD) of the circuit 5a are both ends of the capacitor (Ca).

Figure 7B:
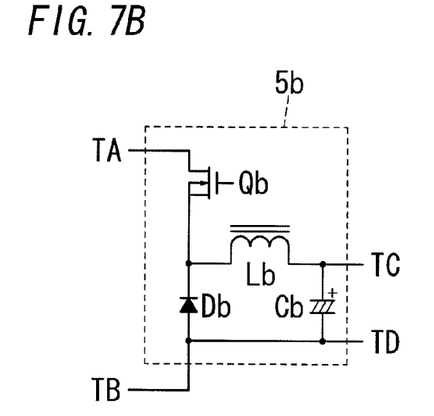
FIG. 7B is a circuit diagram of a buck converter.

FIG. 7B shows a buck chopper circuit 5b formed of a series circuit of a switching device (Qb), an inductor (Lb) and a capacitor (Cb); and a diode (Db) connected in parallel with a series circuit of the inductor (Lb) and the capacitor (Cb). Input terminals (TA and TB) of the buck chopper circuit 5b are both ends of the series circuit of the switching device (Qb), the inductor (Lb) and the capacitor (Cb), and output terminals (TC and TD) of the circuit 5b are both ends of the capacitor (Cb).

Figure 7C:
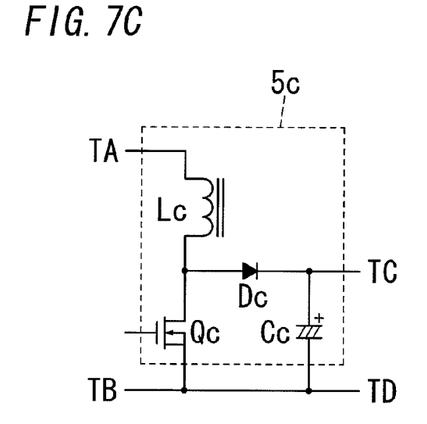
FIG. 7C is a circuit diagram of a boost chopper.

FIG. 7C shows a boost chopper circuit 5c formed of: a series circuit of an inductor (Lc) and a switching device (Qc); and a series circuit of a diode (Dc) and a capacitor (Cc), connected in parallel with the switching device (Qc). Input terminals (TA and TB) of the boost chopper circuit 5c are both end of the series circuit of the inductor (Lc) and the switching device (Qc), and output terminals (TC and TD) of the circuit 5c are both ends of the capacitor (Cc).

Figure 7D:
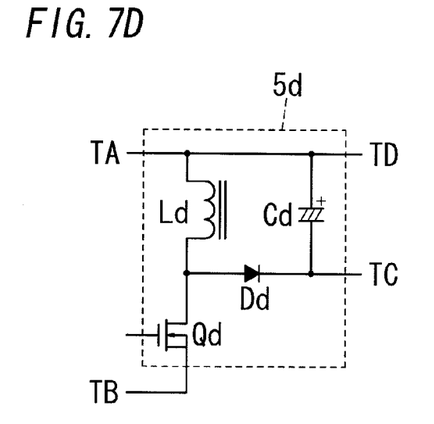
FIG. 7D is a circuit diagram of a boost chopper.

FIG. 7D shows a boost chopper circuit 5d formed of: a series circuit of an inductor (Ld) and a switching device (Qd); and a series circuit of a diode (Dd) and a capacitor (Cd), connected in parallel with the inductor (Ld). Input terminals (TA and TB) of the boost chopper circuit 5d are both ends of the inductor (Ld) and the switching device (Qd), and output terminals (TC and TD) are both ends of the capacitor (Cd).

In any one of FIGS. 7A-7D, a switching device (Qa, Qb, Qc or Qd) is turned on and off at a high frequency, and thereby a direct-current voltage applied across input terminals (TA and TB) is voltage-converted and outputted from output terminals (TC and TD). Any configuration in the first and second embodiments can be applied to a configuration after a capacitor (Ca, Cb, Cc or Cd).

Figure 8:
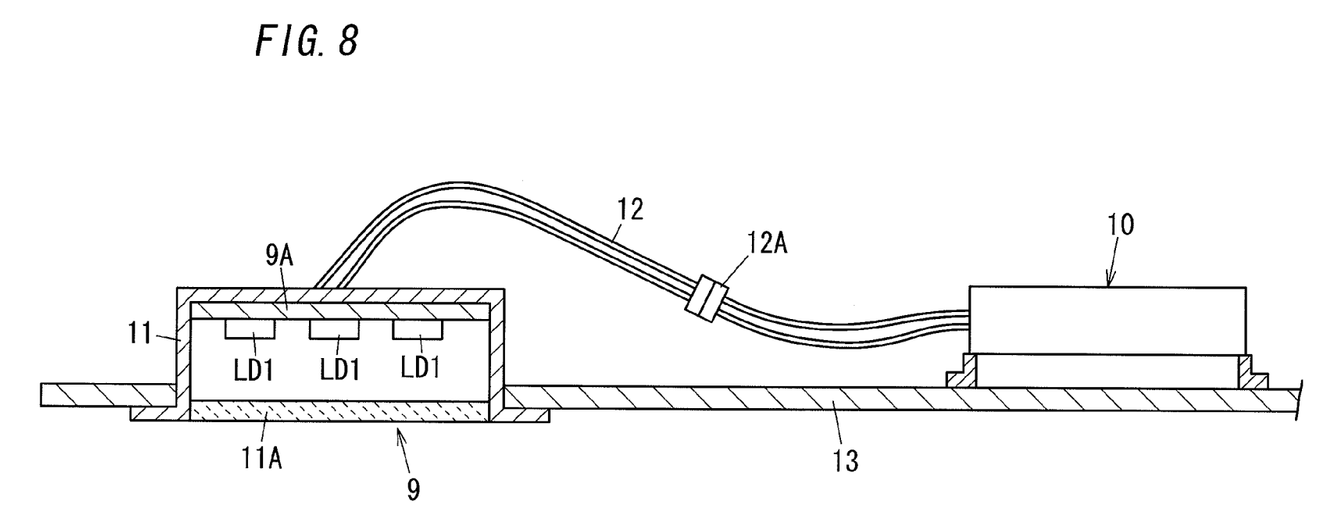
FIG. 8 is a schematic structure chart of a lighting fixture in accordance with a third embodiment of the present invention.

FIG. 8 shows a schematic diagram of a lighting fixture in accordance with an embodiment of the present invention. A drive device 10 in first or second embodiment is employed as a drive device 10 in the present embodiment. As shown in FIG. 8, the lighting fixture in the embodiment is a separate power supply type that a direct-current power supply and the drive device 10 are placed separately from a light source unit 9. A fixture body 11 in which the light source unit 9 is placed is buried in a ceiling 13. Accordingly, the fixture body 11 including the light source unit 9 can be made thin in appearance, and the drive device 10 as a power supply unit placed separately from the light source unit 9 can be located without limitation of installation place.

The fixture body 11 is made of metal such as, fro example, aluminum die-casting, and is in the shape like a cylinder having an upper base and a lower opening. The light source unit 9 includes a substrate 9A mounted on an inner face of the upper base of the fixture body 11, and a plurality of (in the figure, three) light emitting diodes (LD1) mounted on a lower surface of the substrate 9A. Each illumination axis of the light emitting diodes (LD1) is aimed downward so that its own light is irradiated from the lower end of the fixture body 11 to an exterior space. A translucent board 11A for diffusing light from each light emitting diode (LD1) is provided at the lower opening of the fixture body 11. The drive device 10 is located at a different place from the fixture body 11 above the ceiling 11 (specifically, a back side (an upper surface) of the ceiling 11), and electrically connected to the light source unit 9 through a connector 12A and lead wires.

In the embodiment, the drive device 10 that is the same as that in first or second embodiment is employed, and accordingly an advantage that is the same as that in first or second embodiment can be obtained. In the embodiment, the lighting fixture is the separate power supply type that the power supply and the drive device 10 are placed separately from the light source unit 9, but may be an all-in-one type that the drive device 10 is built in the fixture body 11 along with the light source unit 9.

Each drive device 10 in the aforementioned embodiments is not limited to the aforementioned lighting fixture. For example, such a drive device 10 may be employed as a drive device for a backlight of a liquid crystal display, or a light source of a device such as a copy machine, a scanner, a projector or the like. In the aforementioned embodiments, each light emitting element of the light source unit 9 is a light emitting diode (LD), but no limited to this. For example, organic EL devices or semiconductor laser devices may be employed as the light emitting elements of the light source unit 9. In addition, each switching device is not limited to a MOSFET. A bipolar transistor to which a diode is connected in inverse-parallel, an insulated gate bipolar transistor (IGBT) or the like may be employed as such a switching device.

Although the present invention has been described with reference to certain preferred embodiments, numerous modifications and variations can be made by those skilled in the art without departing from the true spirit and scope of this invention, namely claims.

The invention claimed is:

1. A semiconductor light emitting element drive device, comprising:
    a direct-current power supply circuit configured to output direct-current power;
    a converter circuit which has a first switching device and is configured to input the power outputted from the direct-current power supply circuit to variably control an ON width of the first switching device, thereby supplying a load current to a light source unit comprising light emitting elements;
    a current regulation circuit comprising a series circuit, of an impedance component and a second switching device, connected in parallel with the light source unit, said current regulation circuit being configured to variably control the load current through the light source unit by regulation of an ON width of the second switching device; and
    a control unit configured to control ON and OFF of the first and second switching devices,
    wherein the control unit is configured,
    (a) if a dimming ratio of the light source unit is higher than a first ratio, to increase the ON width of the first switching device with the second switching device kept off when increasing the dimming ratio of the light source unit, and also to decrease the ON width of the first switching device with the second switching device kept off when decreasing the dimming ratio of the light source unit, and also
    (b) if a dimming ratio of the light source unit is lower than the first ratio, to regulate the ON width of the second switching device with the ON width of the first switching device held at a lower limit,
    thereby controlling the dimming ratio of the light source unit.

2. The semiconductor light emitting element drive device of claim 1,
    wherein the current regulation circuit comprises:
    a series circuit, of an impedance component and a capacitor, connected in parallel with the light source unit;
    a third switching device adapted to discharge the capacitor when the third switching device is turned on; and
    an inductor placed along a discharge path of the capacitor,
    wherein if the dimming ratio of the light source unit is lower than the first ratio, a pulse voltage derived from an induced power of the inductor generated when the third switching device discharges the capacitor is superposed on an output of the converter circuit.

3. The semiconductor light emitting element drive device of claim 2, wherein an ON and OFF frequency of the second switching device is set to a higher frequency than that corresponding to a video equipment's shutter speed.

4. The semiconductor light emitting element drive device of claim 2, wherein an ON and OFF frequency of the third switching device is set to 120 Hz or more.

5. The semiconductor light emitting element drive device of claim 4, wherein the control unit is configured:
    to keep the third switching device turned off if the dimming ratio of the light source unit is higher than a second ratio; and also
    to control ON and OFF of the third switching device if the dimming ratio of the light source unit is lower than the second ratio.

6. The semiconductor light emitting element drive device of claim 5, wherein the control unit comprises a microcomputer configured to control ON and OFF of at least one of the first to third switching devices based on a dimming signal from outside.

7. The semiconductor light emitting element drive device of claim 4, wherein the control unit comprises a microcomputer configured to control ON and OFF of at least one of the first to third switching devices based on a dimming signal from outside.

8. The semiconductor light emitting element drive device of claim 2, wherein the control unit is configured:
    to keep the third switching device turned off if the dimming ratio of the light source unit is higher than a second ratio; and also
    to control ON and OFF of the third switching device if the dimming ratio of the light source unit is lower than the second ratio.

9. The semiconductor light emitting element drive device of claim 8, wherein the control unit comprises a microcomputer configured to control ON and OFF of at least one of the first to third switching devices based on a dimming signal from outside.

10. The semiconductor light emitting element drive device of claim 2, wherein the control unit comprises a microcomputer configured to control ON and OFF of at least one of the first to third switching devices based on a dimming signal from outside.

11. The semiconductor light emitting element drive device of claim 1, wherein an ON and OFF frequency of the second switching device is set to a higher frequency than that corresponding to a video equipment's shutter speed.

12. A lighting fixture, comprising the semiconductor light emitting element drive device of claim 1,
  wherein the lighting fixture comprises:
   the light source unit which comprises light emitting elements and is adapted to be driven with the semiconductor light emitting element drive device; and
   a fixture body in which the semiconductor light emitting element drive device and the light source unit are placed.

\* \* \* \* \*